United States Patent [19]
Spampinato et al.

[11] Patent Number: 6,078,510
[45] Date of Patent: Jun. 20, 2000

[54] WHOLLY INTEGRATED SWITCH-ON CONTROL LOOP OF A HIGH VOLTAGE POWER TRANSISTOR OF A QUASI RESONANT FLYBACK CONVERTER

[75] Inventors: Sergio Tommaso Spampinato, Catania; Donato Tagliavia, Acireale; Antonino Torres, Palermo, all of Italy

[73] Assignee: STMicroelectronics S.r.l., Agrate Brianza, Italy

[21] Appl. No.: 09/400,775

[22] Filed: Sep. 22, 1999

[30] Foreign Application Priority Data

Sep. 23, 1998 [EP] European Pat. Off. ............. 98830554

[51] Int. Cl.$^7$ ................................................. H02M 3/335
[52] U.S. Cl. ................................................. 363/21; 363/19
[58] Field of Search .................. 363/18, 19, 20, 363/21, 95, 97, 131, 235, 265, 266, 902

[56] References Cited

U.S. PATENT DOCUMENTS

| | | | |
|---|---|---|---|
| 4,462,069 | 7/1984 | Becky | 363/23 |
| 5,448,466 | 9/1995 | Erckert | 363/16 |
| 5,479,330 | 12/1995 | Bergk | 363/19 |
| 5,717,578 | 2/1998 | Afzal | 363/21 |
| 5,796,597 | 8/1998 | Fitzgerald | 363/21 |
| 5,831,837 | 11/1998 | Coyne et al. | 363/21 |

FOREIGN PATENT DOCUMENTS 0 190 904 A2   2/1986   European Pat. Off. .

98/11659   3/1998   WIPO .

*Primary Examiner*—Adolf Deneke Berhane
*Assistant Examiner*—Gary L. Laxton
*Attorney, Agent, or Firm*—Theodore E. Galanthay; Allen, Dyer, Doppelt, Milbrath & Gilchrist, P.A.

[57] ABSTRACT

A flyback DC—DC converter employs a flyback transformer for storing and transferring energy to a load having an auxiliary winding whose voltage is compared by a comparator with a threshold to detect its crossing. As a consequence, a power transistor driving the primary winding of the transformer is switched on through a control flip-flop, for a new phase of conduction and accumulation of energy, whose duration is established by a secondary control loop of the output voltage producing the switching off of the power transistor for a successive energy transfer phase toward the load of the energy stored in the transformer during the preceding conduction phase. The converter has a wholly integrated control circuit that includes a second comparator of the voltage existing on the current terminal of the power transistor connected to the primary winding of the transformer with respect to the ground potential of the circuit. Furthermore, a delay network is coupled in cascade to the output of a first comparator and has an output coupled to a second input of a logic gate, so that under steady state functioning conditions of the converter, the setting of the flip-flop is done by the second comparator rather than by the first comparator.

14 Claims, 4 Drawing Sheets

WHOLLY INTEGRATED SWITCH-ON CONTROL LOOP OF A HIGH VOLTAGE POWER TRANSISTOR OF A QUASI RESONANT FLYBACK CONVERTER

FIELD OF THE INVENTION

The present invention relates to flyback DC—DC converters, and, more particularly, to flyback DC—DC converters which operate in a quasi resonant or "zero voltage" switch-on mode that switches on when the voltage of the conductive terminal of the switching element is in the vicinity of zero volts.

BACKGROUND OF THE INVENTION

The quasi resonant functioning mode of flyback DC—DC converters at steady state conditions is particularly efficient because, compared to traditional flyback applications (hard switching mode), it allows for a reduction of power dissipation during the switching phases and a reduction of electromagnetic noise.

FIG. 1 shows the basic scheme of a flyback converter for quasi resonant applications. The switching element Q1 is indicated as being a bipolar junction transistor though it may be of a different type. The D1 and C1 components allow for a quasi resonant functioning, also called QRC mode. In traditional applications, such as in hard-switching applications, their function is performed by dedicated snubber or clamper circuits.

The type of control of the switchings of the (Q1) power switch is similar to that of selfoscillating circuits, commonly named SOPS (Self Oscillating Power Supply), because the switch-on is commanded always in the vicinity of the instant at which the current on the secondary winding of the flyback transformer becomes null. Hence, the converter always functions in a discontinuous manner, that is, with the current becoming null at every cycle, though remaining at the border between continuous and discontinuous functioning conditions.

During the ON phase of Q1, the D2 diode is OFF and there is an accumulation of energy in the primary winding of the transformer, which is transferred to the secondary during the OFF phase of Q1. In this phase the voltage Vc on the Q1 terminals is Vc=Valim+(N1:N2) V2 (being V2» Vout)

When the energy is completely transferred ($I_{F(D2)}=0$), the voltage Vc oscillates at the resonant frequency given by $$F_r \cong \frac{1}{2\Pi\sqrt{L_p C_1}}$$

By suitably sizing the electrical parameters it is possible to produce an oscillation capable of allowing the diode D1 to conduct for a short period of time in order to realize a control transistor of the Q1 power during this phase, thus eliminating of the switch-on losses.

Therefore, the flyback converter belongs to the class of the so-called "zero-voltage quasi resonant" converters. These converters are frequently used in TV and VCR power supplies, wherein the input voltage Valim is obtained by rectifying and filtering the main voltage. Such a preference is due also to the fact that the architecture of these converters allows for multiple outputs by simply increasing the number of secondary windings of the flyback transformer. The auxiliary winding AUS is used to self power the control circuit during steady state functioning.

For such applications, during the switch-off phase, the power transistor Q1 that implements the switch must withstand voltages that may reach or even exceed a thousand volts. In case of a completely monolithic realization (control circuits and power device realized on the same chip), a fabrication technology usually referred to as "Smart Power", suitable for high voltage applications, must be used.

Traditional QRC flyback converters are realized with discrete components, or in the form of an integrated device containing a low voltage control circuit, a high voltage power MOS transistor and eventually some of the passive components, later realized in so-called SMD technology. As depicted by way of an example in FIG. 3, the switch-on under a quasi resonant condition is obtained through an external Tdelay network connected to the auxiliary winding Aus and dimensioned so as to synchronize the condition Vc=0 with the switching of a comparator of the control circuit contained in the CONTROL-IC block, within the time interval indicated as Tdelay in the diagrams of FIG. 2.

Thus, the integrated circuit of the block CONTROL IC controls a selfoscillating or SOPS functioning mode of the converter. Replacing the delay block TDELAY with a resistor would produce a classic hard-switching flyback application.

In traditional circuits, the QRC function is thus obtained through external networks, which especially in TV applications, where there are large variations of either the supply voltage and the load, necessitate a substantial number of components, as illustrated in the detail of the block Tdelay of FIG. 3. However, other circuit arrangements of the delay network may be used, depending on the specific characteristics of the application.

Therefore, known circuits have the drawback of requiring the realization of a Tdelay network with discrete elements external to the integrated circuit. Moreover, the switching under zero voltage conditions is tied to the precision of the Tdelay network (that is, to the spread of the actual values of the network components) as well as to the electrical parameters that establish the resonance frequency (the spread of the values of Lp and Cr).

SUMMARY OF THE INVENTION

An object of the present invention is to provide a QRC quasi resonant selfoscillating flyback DC—DC converter with the synchronization of the switch-on of the power transistor, when the voltage thereon becomes null, realized with a wholly integrated circuit.

According to the present invention, this objective is obtained by monitoring, rather than the voltage existing on one auxiliary winding of the flyback transformer, as normally done in known circuits, the voltage existing on the current terminal of the power transistor connected to the primary winding of the flyback transformer. Furthermore, this is done by controlling the "set" terminal of a driving flip-flop of the power transistor through a OR logic gate, to an input of which is coupled the output of the comparator of the voltage present on the current node of the power transistor, while the other input of which is coupled, through an integrated Tdelay network, to the output of the comparator of the voltage present on the auxiliary winding in respect to a reference voltage generated by a control circuit of the converter.

The comparator of the voltage on the current terminal of the power transistor in respect to the ground potential of the circuit is integrated with the same high voltage fabrication technology that is used to realize high voltage power transistors. Specifically, the components of the input stage of the comparator, which are subject to voltages that may reach and exceed thousands of volts are integrated with such high voltage fabrication technology.

BRIEF DESCRIPTION OF THE DRAWINGS

The various aspects and advantages of the invention will become even clearer through the following description of an embodiment and by referring to the attached drawings, wherein.

DETAILED DESCRIPTION OF THE PREFERRED EMBODIMENTS

Figure 4:
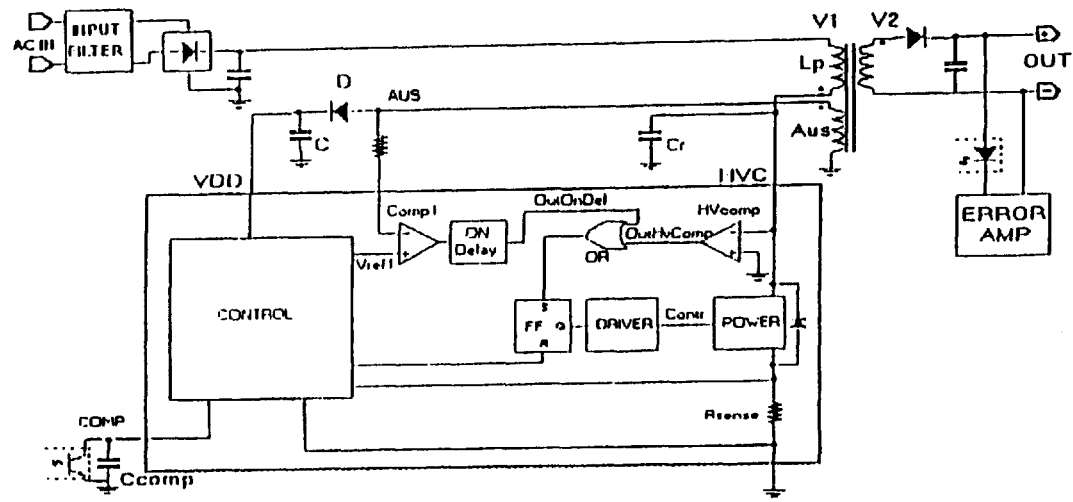
FIG. 4 is a schematic view of a complete basic scheme of a QRC flyback DC-DC converter in accordance with the present invention.

FIG. 4 shows the basic scheme of an embodiment of a quasi resonant selfoscillating flyback converter in accordance with the present invention. All the components included within the rectangular perimeter are integrated on a single chip.

The integrated circuit is operated at steady state through the $V_{DD}$ pin by charging a supply capacitor C of high capacitance through a diode D, whose anode, according to a common practice, is coupled to the voltage induced on the Aus auxiliary winding of the transformer. Although not expressly shown in FIG. 4, the converter includes internal or external means to ensure the charging of the capacitor C during the power-on phase. The secondary regulating loop of the output voltage commonly uses, an error amplifier ERROR AMP whose output is coupled, by way of the photo-diode and the photo-transistor, to the relative pin COMP of the integrated circuit to which is connected a compensation capacitor CCOMP of the secondary regulating loop of the output voltage.

A primary regulating loop, whose function is explained in the following description, is realized through the comparator COMP1 which compares the voltage of the auxiliary winding Aus with a pre-established threshold Vref1, fixed by the control circuitry, represented as a whole by the CONTROL block of the diagram of FIG. 4. The secondary control loop of the output voltage switches off the switch POWER by driving the reset of the command flip-flop FF according to a traditional control scheme.

According to a fundamental aspect of the invention, the synchronization of the switch-on of the POWER switch with the zero crossing instant of the HVC voltage on the current terminal of the power transistor POWER connected to the primary winding of the flyback transformer is effected by controlling the set command of the flip-flop FF through an OR logic gate. A first input of the OR gate is coupled to the output of a high voltage comparator HVCOMP of the voltage present on the current terminal of the POWER in respect to the ground potential of the circuit. Such a voltage coincides with the potential of the substrate of the integrated circuit.

The output of the first comparator Comp1 is coupled to the second input of the OR logic gate, through a delay network On Delay functionally connected in cascade to the output of the COMP1 comparator.

From FIG. 4 it may be easily verified that for a substrate voltage Vsub=$V_{HVC} \leq 0V$, the output voltage of the high voltage comparator $V_{OUT}$HVCOMP switches from a low logic state to a high logic state, provoking the setting of the flip-flop FF and thereby the switching on of the power transistor POWER. This realizes the synchronization of the switching on during the quasi resonant steady state functioning of the converter, without external components.

In any case, the quasi resonant condition only exists during steady state operation but not during the start-up and recovery phases. During these phases, the output voltage is reduced and may be zero at the power on instant. Therefore, the voltage induced on the auxiliary winding is insufficient to allow for oscillations of sufficient amplitude. Under such conditions, the control circuit must guarantee the switching on of the switch POWER and this function is performed by the comparator COMP1 through the ON DELAY block and the OR logic gate.

Figure 1:
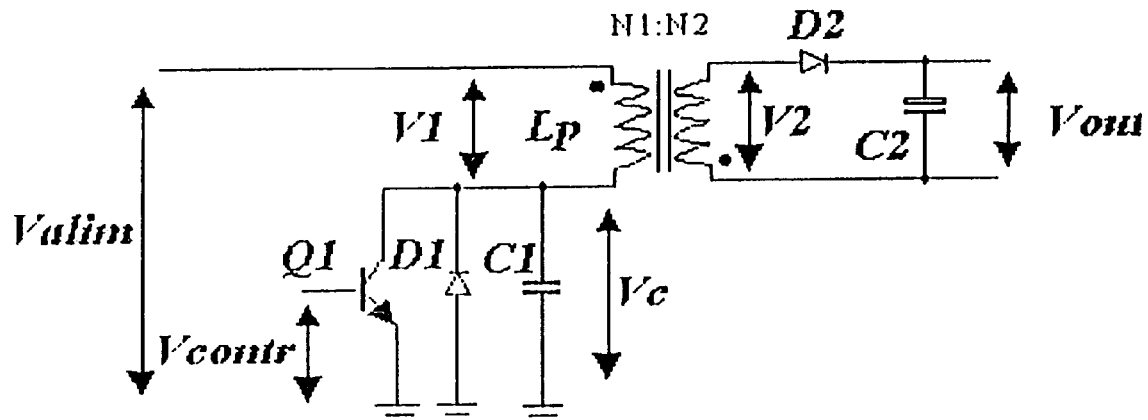
FIG. 1 is a schematic view of a basic scheme of a quasi resonant flyback converter.
Figure 2:
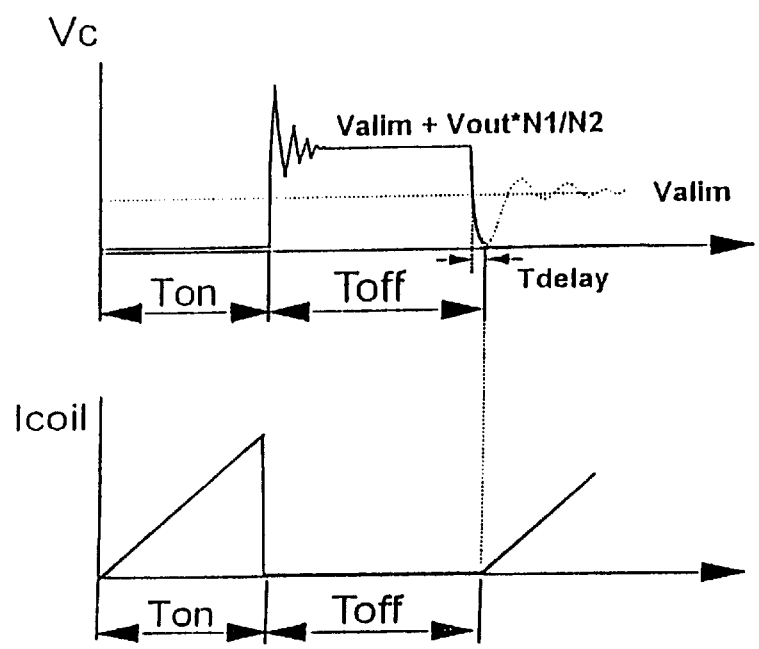
FIG. 2 illustrates waveforms of the current and voltage relative to the power transistor.
Figure 3:
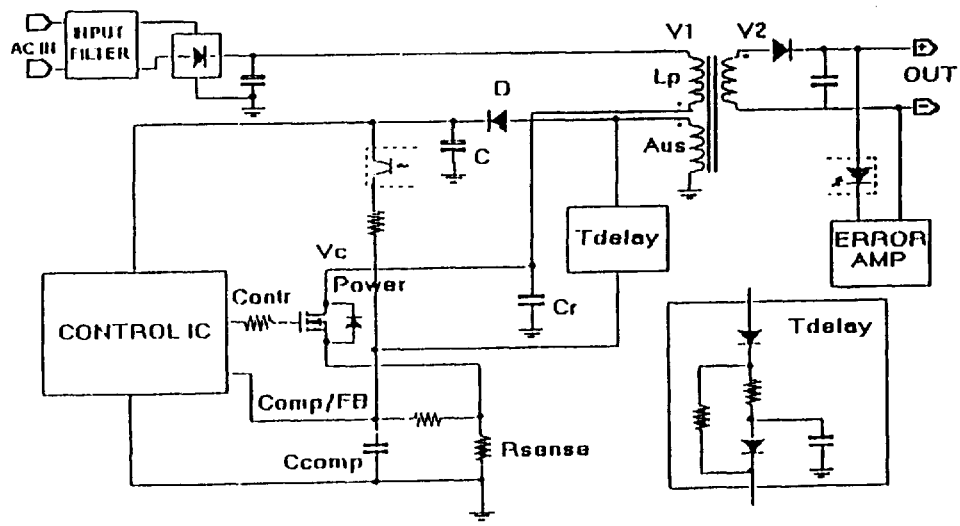
FIG. 3 is a schematic view of a complete basic scheme of a typical QRC DC—DC flyback converter.

The On DELAY block is designed to ensure that during the steady state selfoscillating function, the set of the command flip-flop FF is caused by the switching of the high voltage comparator HVCOMP rather than by the switching of the comparator COMP1. This ensures a POWER switching on of the power transistor POWER in a quasi resonant condition. This delay may also be fixed when designing the circuit, similarly to what was done for the delay block Tdelay of the traditional scheme of FIG. 3, in order to switch on the power switch at zero voltage conditions on its terminals. However, it is evident that without a second high voltage comparator HVCOMP a perfect synchronization of the switching cannot be guaranteed, and the circuit would be subject to the effects of the deviations from the nominal design values of the different components due to the fabricating process.

Thus, the high voltage comparator HVCOMP ensures the correct functioning of the zero voltage quasi resonant converter of the invention, regardless of process spreads of the Lp and Cr values which fix the converter's resonance frequency.

Figure 5:
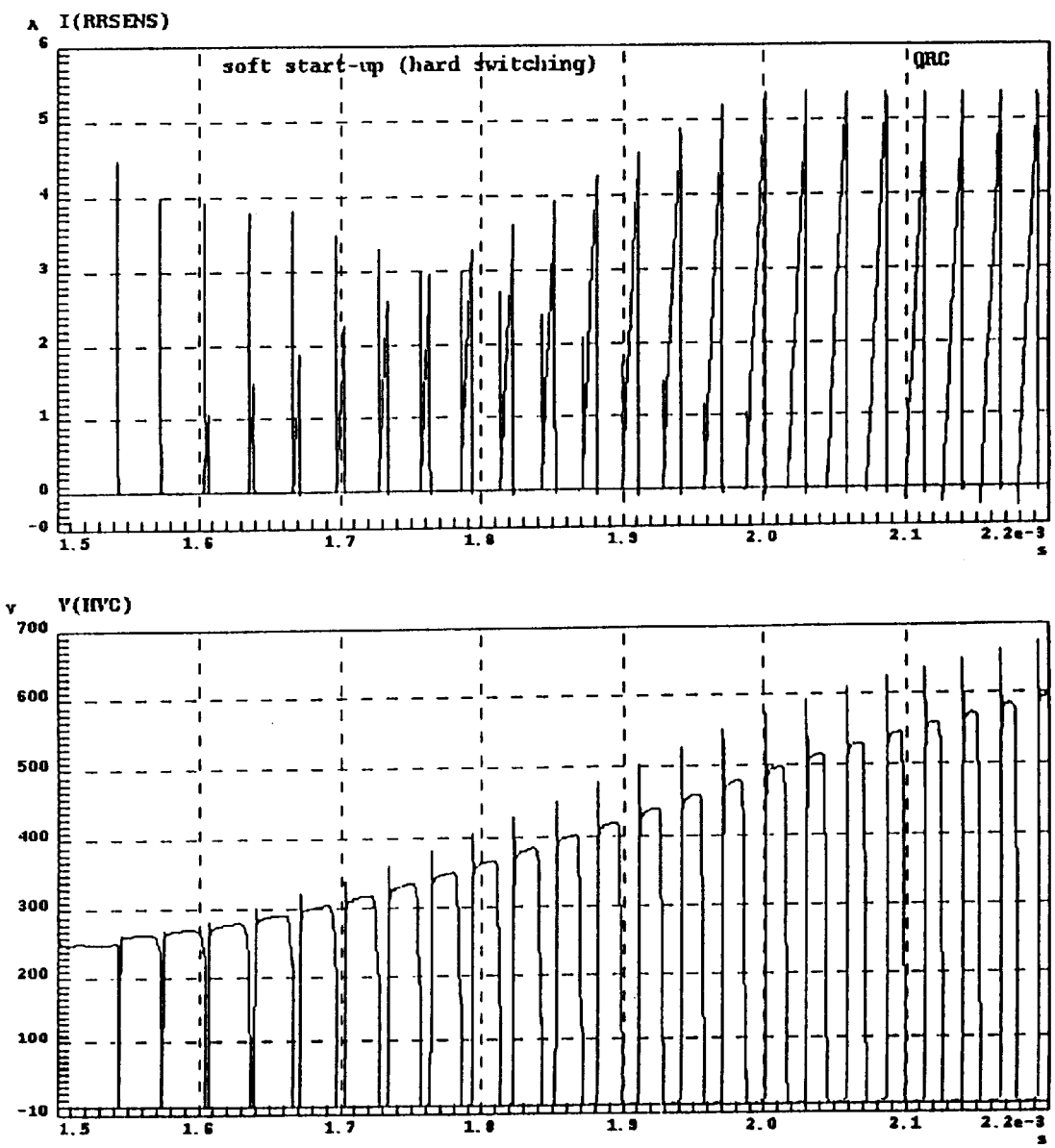
FIG. 5 illustrates waveforms of the current through the power transistor and the voltage on the transistor current terminals for the start-up phase and steady state of a QRC flyback DC—DC converter in accordance with the present invention.
Figure 6:
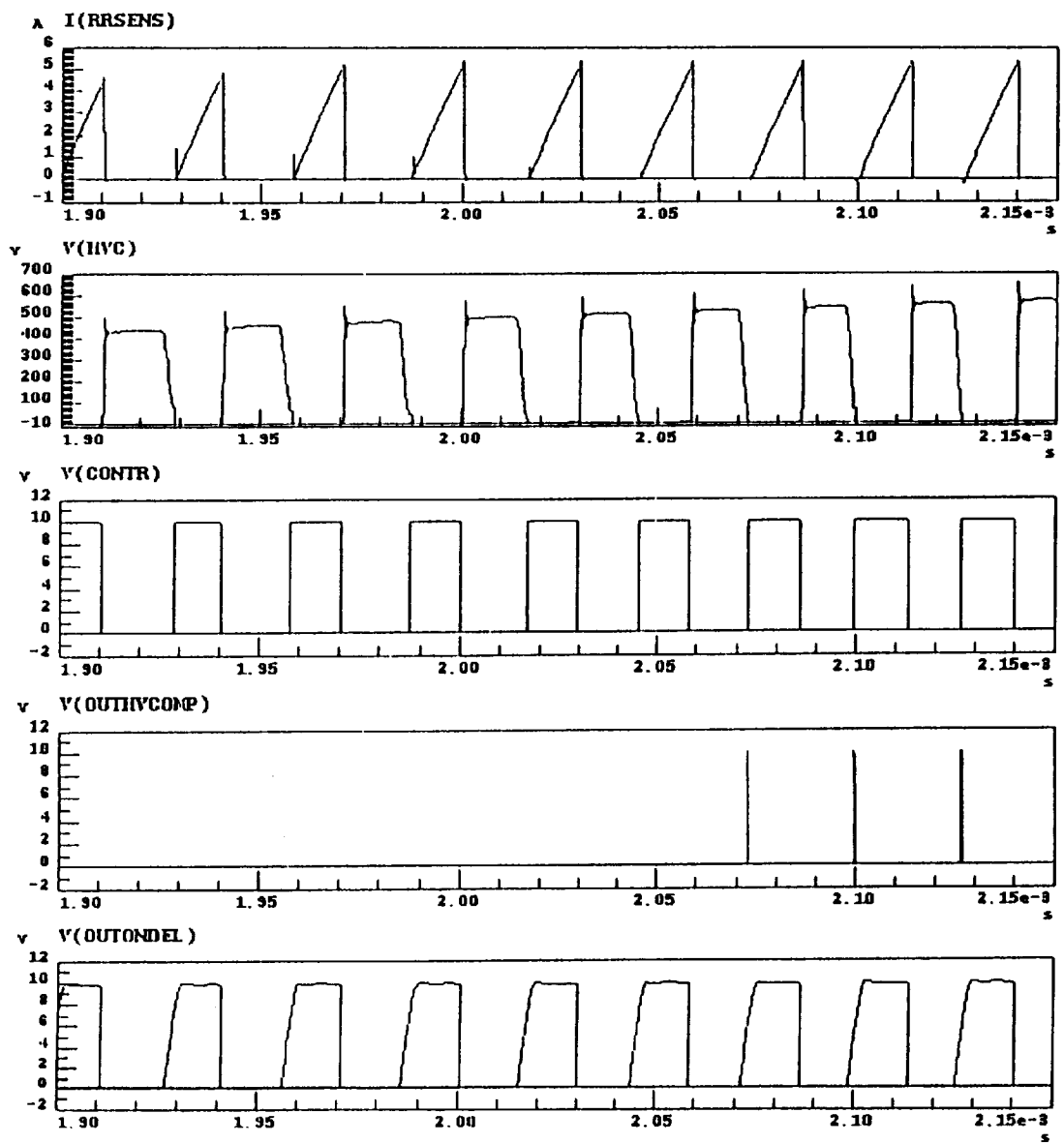
FIG. 6 illustrates a number of enlarged waveforms of significant signals.

Main waveforms from a computer simulation of the circuit of FIG. 4, with a resistive load coupled to the circuit output OUT, are shown in FIGS. 5 and 6. Upon observing the current and voltage waveforms on the power transistors POWER shown in FIG. 5, relative to a start-up phase and to a successive steady state condition, initially, the hard-switching condition (current peaks at the switch-on due to the discharge of the capacitor Cr) and the successive passage to quasi resonant switchings (elimination of the peaks and thereby of the switching losses) appear evident.

FIG. 6 shows the waveforms of the preceding FIG. 5 in greater detail, together with the control voltage of the power transistor switchings and of the output voltages of the high voltage comparator HVCOMP and of the block ON DELAY, respectively, in correspondence of the passage from the hard-switching mode and the QRC mode.

Which is claimed is:
1. A flyback DC—DC converter comprising:
    a flyback transformer for storing and transferring energy to a load, the flyback transformer comprising a primary winding and an auxiliary winding;

a primary control loop including a first comparator for comparing a voltage of the auxiliary winding with a threshold;

a control flip-flop device connected to the output of the first comparator;

a power transistor having a conducting terminal connected to the primary winding of the flyback transformer for driving the primary winding of the flyback transformer, the power transistor being connected to the control flip-flop device for switching on the power transistor in response to the first comparator;

a secondary control loop for switching off the power transistor to transfer energy stored in the transformer to the load;

a second comparator for comparing the voltage on the conducting terminal of the power transistor with a reference voltage and for switching on the power transistor;

a logic gate having a first input connected to an output of the second comparator and an output connected to a setting terminal of the control flip-flop device; and a delay device connected to the output of the first comparator and having an output connected to a second input of the logic gate, for ensuring, under steady state conditions, a setting of the control flip-flop device by the second comparator instead of by the first comparator.

2. A flyback DC—DC converter according to claim 1, wherein the first comparator, the control flip-flop device, the power transistor, the second comparator, the logic gate, and the delay device are integrated on a single chip.

3. A flyback DC—DC converter according to claim 1, wherein the second comparator comprises a high voltage comparator including integrated high voltage components that can withstand voltages greater than 1000 volts.

4. A flyback DC—DC converter according to claim 1, wherein the reference voltage is a ground potential of the flyback DC—DC converter.

5. A flyback DC-DC converter comprising:

a flyback transformer for storing and transferring energy to a load, the flyback transformer comprising a primary winding and an auxiliary winding;

a first comparator for comparing a voltage of the auxiliary winding with a threshold;

a delay device connected to an output of the first comparator;

a power transistor having a conducting terminal connected to the primary winding of the flyback transformer for driving the primary winding of the flyback transformer;

a second comparator for comparing the voltage on the conducting terminal of the power transistor with a reference voltage;

a logic gate having a first input connected to an output of the second comparator, and a second input connected to an output of the delay device; and a control flip-flop device having a setting terminal connected to an output of the logic gate, and being connected to the power transistor for switching on the power transistor in response to one of the first comparator and the second comparator.

6. A flyback DC—DC converter according to claim 5, wherein the first comparator, the control flip-flop device, the power transistor, the second comparator, the logic gate, and the delay device are integrated on a single chip.

7. A flyback DC—DC converter according to claim 5, wherein the delay device ensures, under steady state conditions, a setting of the control flip-flop device by the second comparator.

8. A flyback DC—DC converter according to claim 5, wherein the second comparator comprises a high voltage comparator including integrated high voltage components that can withstand voltages greater than 1000 volts.

9. An integrated flyback DC—DC converter according to claim 5, wherein the reference voltage is a ground potential of the flyback DC—DC converter.

10. A method of operating a flyback DC—DC converter comprising a flyback transformer having a primary winding and an auxiliary winding, and a power transistor having a conducting terminal connected to the primary winding of the flyback transformer, the method comprising the steps of:

comparing a voltage of the auxiliary winding with a threshold, using a first comparator;

comparing a voltage on the conducting terminal of the power transistor with a reference voltage, using a second comparator;

selecting one of an output of the second comparator and a delayed output of the first comparator using a logic gate;

setting a control flip-flop device with an output of the logic gate; and switching on the power transistor in response to the control flip-flop device to drive the primary winding of the flyback transformer.

11. A method according to claim 10, wherein the first comparator, the control flip-flop device, the power transistor, the second comparator, and the logic gate are provided on a single integrated chip.

12. A method according to claim 10, wherein the control flip-flop device is set by the second comparator under steady state conditions.

13. A method according to claim 10, wherein the second comparator comprises a high voltage comparator including integrated high voltage components that can withstand voltages greater than 1000 volts.

14. A method according to claim 10, wherein the reference voltage is a ground potential of the flyback DC—DC converter.

* * * * *